United States Patent
Morigaki

(10) Patent No.: US 9,012,085 B2
(45) Date of Patent: Apr. 21, 2015

(54) LITHIUM BATTERY

(75) Inventor: Kenichi Morigaki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1066 days.

(21) Appl. No.: 12/922,977

(22) PCT Filed: Mar. 19, 2009

(86) PCT No.: PCT/JP2009/001229
§ 371 (c)(1),
(2), (4) Date: Sep. 16, 2010

(87) PCT Pub. No.: WO2009/133654
PCT Pub. Date: Nov. 5, 2009

(65) Prior Publication Data
US 2011/0027652 A1  Feb. 3, 2011

(30) Foreign Application Priority Data
Apr. 28, 2008 (JP) .................. 2008-117415

(51) Int. Cl.
*H01M 4/50* (2010.01)
*H01M 4/505* (2010.01)
(Continued)

(52) U.S. Cl.
CPC ............. *H01M 4/505* (2013.01); *H01M 4/131* (2013.01); *H01M 4/502* (2013.01); *H01M 10/052* (2013.01); *H01M 2004/021* (2013.01); *Y02E 60/122* (2013.01)

(58) Field of Classification Search
CPC ..... H01M 10/052; H01M 4/50; H01M 4/502; H01M 4/131

USPC .......... 429/224, 231.95, 324, 231.6; 423/599; 264/104–105
See application file for complete search history.

(56) References Cited

U.S. PATENT DOCUMENTS

| 4,133,856 A * | 1/1979 | Ikeda et al. .................. 264/104 |
| 2003/0138700 A1 | 7/2003 | Yoshimura et al. |

(Continued)

FOREIGN PATENT DOCUMENTS

| JP | 07-037593 | 2/1995 |
| JP | 09-115515 | 5/1997 |

(Continued)

OTHER PUBLICATIONS

Machine Translation in English of JP 09153358.*

(Continued)

*Primary Examiner* — Zachary Best
(74) *Attorney, Agent, or Firm* — McDermott Will & Emery LLP

(57) ABSTRACT

A lithium battery (1) including a positive electrode (10) containing low-crystallinity manganese dioxide having a specific surface area of 8 to 28 $m^2/g$ as a positive electrode active material, a negative electrode (11) containing metallic lithium or a lithium alloy as a negative electrode active material, and an organic electrolyte is provided. The lithium battery (1), due to said low-crystallinity manganese dioxide contained therein, has excellent storage characteristics at high temperatures of 100° C. or higher, large-current discharge characteristics, large-current pulse discharge characteristics, low-temperature discharge characteristics, and like characteristics, and in addition, is cost advantageous.

4 Claims, 2 Drawing Sheets

(51) Int. Cl.
*H01M 4/131* (2010.01)
*H01M 10/052* (2010.01)
*H01M 4/02* (2006.01)

(56) References Cited

U.S. PATENT DOCUMENTS

2006/0127778 A1 6/2006 Kawai et al.
2008/0032198 A1* 2/2008 Yamaguchi et al. .......... 429/224

FOREIGN PATENT DOCUMENTS

| JP | 09-139211 | 5/1997 |
|----|-----------|--------|
| JP | 09-153358 | 6/1997 |
| JP | 10-027607 | 1/1998 |
| JP | 2000-235860 | 8/2000 |
| JP | 2003-217579 | 7/2003 |
| JP | 2005-0038839 | 2/2005 |
| JP | 2005-100944 | 4/2005 |
| JP | 2005-100965 | 4/2005 |
| JP | 2005-216867 | 8/2005 |
| JP | 2006-134851 | 5/2006 |

OTHER PUBLICATIONS

Machine Translation in English of JP 2005038839.*
Machine Translation in English of JP 2006134851.*

* cited by examiner

LITHIUM BATTERY

RELATED APPLICATIONS

This application is the U.S. National Phase under 35 U.S.C. §371 of International Application No. PCT/JP2009/001229, filed on Mar. 19, 2009, which in turn claims the benefit of Japanese Application No. 2008-117415, filed on Apr. 28, 2008, the disclosures of which Applications are incorporated by reference herein.

TECHNICAL FIELD

The present invention relates to a lithium battery. More specifically, the present invention primarily relates to an improvement of a positive electrode active material for use in a lithium battery.

BACKGROUND ART

Lithium batteries have higher voltages and energy densities than conventional aqueous batteries that use an aqueous solution of a supporting salt as an electrolyte, and it is thus easy to make small, light-weight lithium batteries. Moreover, lithium batteries undergo less deterioration from, for example, self-discharging and have much higher long-term reliability than aqueous batteries. Lithium batteries therefore have been used in various applications, for example, as a main power source and a backup power source of small electronic devices.

Typical lithium batteries use metallic lithium or an alloy thereof as a negative electrode active material and a metal oxide such as manganese dioxide as a positive electrode active material and further contain an organic electrolyte. Generally, an organic electrolyte contains a non-aqueous solvent and a solute. For example, high-permittivity solvents such as propylene carbonate (PC) and γ-butyrolactone (GBL), low-boiling low-viscosity solvents such as 1,2-dimethoxyethane (DME) and 3-methyltetrahydrofuran (Me-THF), and similar solvents are used as such non-aqueous solvents. For example, lithium perchlorate ($LiClO_4$), lithium tetrafluoroborate ($LiBF_4$), and the like are used as such supporting salts.

However, lithium batteries that use manganese dioxide as a positive electrode active material are problematic in that a prolonged intermittent pulse discharge after high-temperature storage results in a rapidly increased internal resistance of the batteries and makes discharging impossible. Batteries for use as a main power source of small electronic devices and the like are required to have the ability to perform an intermittent large-current pulse discharge. Therefore, there is still room for improvement of manganese dioxide-containing lithium batteries used as a main power source of small electronic devices that are relatively often exposed to high temperatures.

Moreover, lithium batteries that use manganese dioxide as the positive electrode active material, once molded into coin-shaped batteries, result in the problem that gas may be generated after high-temperature storage at 100° C. or higher. No less than 90% of the gas generated inside the batteries is carbon dioxide, and it is therefore believed that the non-aqueous solvent contained in the organic electrolyte undergoes oxidative decomposition due mostly to the manganese dioxide serving as the positive electrode active material, and carbon dioxide is thus generated. In coin-shaped lithium batteries, the electrical connection between the positive electrode active material layer and the positive electrode current collector as well as the ionic conduction between the positive electrode, the separator, and the negative electrode are retained by the compression created by the sealing pressure. Therefore, the pressure inside the battery that is created by the generation of gas in the battery and that is greater than the sealing pressure may inhibit a smooth electrical connection and ionic conduction, making a smooth discharge impossible even when there is battery capacity remaining. Therefore, there is a demand for a technique that inhibits the generation of gas during high-temperature storage.

Various positive electrode active materials for lithium batteries have been proposed. For example, λ-β type manganese dioxide having a specific surface area of 1 to 8 $m^2/g$ in which part of the manganese is substituted with another element so as to inhibit the reaction between manganese dioxide and an organic electrolyte have been proposed (for example, see Patent Document 1). In Patent Document 1, the element substituted for manganese is at least one element selected from the group consisting of nonmetallic elements of Groups 13 to 15, metalloid elements of Groups 13 to 15, alkali metals, alkaline earth metals, and metallic elements other than manganese.

In Patent Document 1, λ-β type manganese dioxides are produced according to a method including a baking step, an acid washing step, and a rebaking step.

In the baking step, manganese dioxide, a lithium salt, and a compound containing another element are baked at 550 to 950° C. for 5 to 20 hours to synthesize a spinel lithium manganese complex oxide.

In the acid washing step, acid washing removes lithium and the like from the spinel lithium manganese composite oxide. In this step, the lithium content of the spinel lithium manganese composite oxide is controlled to 0.2 to 1 mass %, and for this purpose it is necessary to use a strong acid having a pH of about 2, making the work environment very dangerous.

In the rebaking step, the required baking time is 2 to 10 hours.

As described above, with the technique disclosed in Patent Document 1, the steps of producing λ-β type manganese dioxide are complex, and the technique requires a long period of time, provides poor worker safety, and is very costly.

Manganese dioxide to which 0.1 to 2 wt % of boron and 0.02 to 2 wt % of phosphorus are added has been proposed to inhibit the dissolution of manganese in an organic electrolyte (for example, see Patent Document 2). The technique of Patent Document 2 is effective in preventing manganese from leaching into an organic electrolyte when the battery is stored at 70° C. However, when the battery is stored at 100° C. or higher, the generation of gas due to the decomposition of the organic electrolyte cannot be sufficiently inhibited.

A composite oxide of boron-containing lithium and manganese has been proposed to improve charge-discharge cycle characteristics (for example, see Patent Document 3). However, this composite oxide is a positive electrode active material for use in a secondary battery. This composite oxide is effective in improving the charge-discharge cycle characteristics and reducing the self-discharge rate of a secondary battery. However, when a battery is stored at 100° C. or higher, the generation of gas cannot be sufficiently inhibited. In addition, this composite oxide when having a large boron content functions to deteriorate the discharge capacity and the discharge voltage.

Lithium-containing manganese dioxide in which a specific lithium compound and a hydroxide, carbonate, or nitrate of a specific element are added to manganese dioxide and baked has been proposed to improve the discharge capacity of manganese dioxide (for example, see Patent Document 4). The technique of Patent Document 4 enhances the availability of lithium-containing manganese dioxide as a positive electrode active material by stabilizing its structure. However, when the battery is stored at 100° C. or higher, the generation of gas cannot be sufficiently inhibited by the technique of Patent Document 4 either.

Furthermore, addition of a sultone derivative such as 1,3-propanesultone to a mixed solvent of a carbonic acid ester and ether, for example, has been proposed as an improvement of an organic electrolyte (for example, see Patent Document 5). Addition of a sultone derivative to an organic electrolyte enhances the high-temperature storage characteristics of the organic electrolyte. However, in the organic electrolyte-containing lithium battery of Patent Document 5 also, the generation of gas cannot be sufficiently inhibited when the battery is stored at 100° C. or higher.

As described above, the lithium batteries of Patent Documents 1 to 5 do not have satisfactory high-temperature storage characteristics at 100° C. or higher.

Patent Document 1: Japanese Laid-Open Patent Publication No. 2005-100944

Patent Document 2: Japanese Laid-Open Patent Publication No. 2003-217579

Patent Document 3: Japanese Laid-Open Patent Publication No. Hei 9-115515

Patent Document 4: Japanese Laid-Open Patent Publication No. Hei 9-139211

Patent Document 5: Japanese Laid-Open Patent Publication No. 2005-216867

DISCLOSURE OF THE INVENTION

Problem to be Solved by the Invention

An object of the present invention is to provide a lithium battery having a practically sufficient discharge capacity, having excellent high-temperature storage characteristics and discharge characteristics, being capable of large-current discharge and large-current pulse discharge, and being cost advantageous.

Means for Solving the Problem

The inventor, having conducted extensive research to address the above-described problems, found as a result that the use of low-crystallinity manganese dioxide having a specific surface area of 8 to 28 $m^2/g$ as a positive electrode active material can inhibit the reaction between manganese dioxide and an organic electrolyte in a high-temperature environment as well as an increase in the pressure within a battery that occurs due to the generation of gas. The present invention was accomplished based on this finding.

In other words, the present invention provides a lithium battery including a positive electrode, a negative electrode, and an organic electrolyte. The positive electrode includes low-crystallinity manganese dioxide having a specific surface area of 8 to 28 $m^2/g$ as a positive electrode active material. The negative electrode includes at least one selected from metallic lithium and lithium alloys as a negative electrode active material.

It is preferable that the low-crystallinity manganese dioxide has a ratio [I(110)/I(101)] of the peak intensity I(110) of a diffraction peak for the (110) plane near $2\theta=28°$ to the peak intensity I(101) of a diffraction peak for the (101) plane near $2\theta=37.5°$ of 0.5 to 0.58 in a powder X-ray diffraction pattern with CuKα radiation.

It is more preferable that the low-crystallinity manganese dioxide contains boron and a Group 2 element, the boron content is 0.3 wt % or greater of the total amount of the low-crystallinity manganese dioxide, and the Group 2 element content is 0.2 to 5 wt % of the total amount of the low-crystallinity manganese dioxide.

It is more preferable that the Group 2 element is magnesium or calcium.

Effect of the Invention

The lithium battery of the present invention has a practically sufficient discharge capacity, has excellent high-temperature storage characteristics and discharge characteristics, and is capable of large-current discharge and large-current pulse discharge. For example, even when the lithium battery is stored in a high-temperature environment, e.g., 125° C., the decomposition reaction of the organic electrolyte due to the positive electrode active material low-crystallinity manganese dioxide does not proceed, and an increase in the pressure in the battery that is created by the generation of gas does not occur. Therefore, the abnormal deformation such as expansion of the battery, does not occur and a dischargeable state is maintained. Moreover, even after high-temperature storage, a pulse discharge of a current at a relatively high voltage is possible.

BEST MODE FOR CARRYING OUT THE INVENTION

Figure 1:
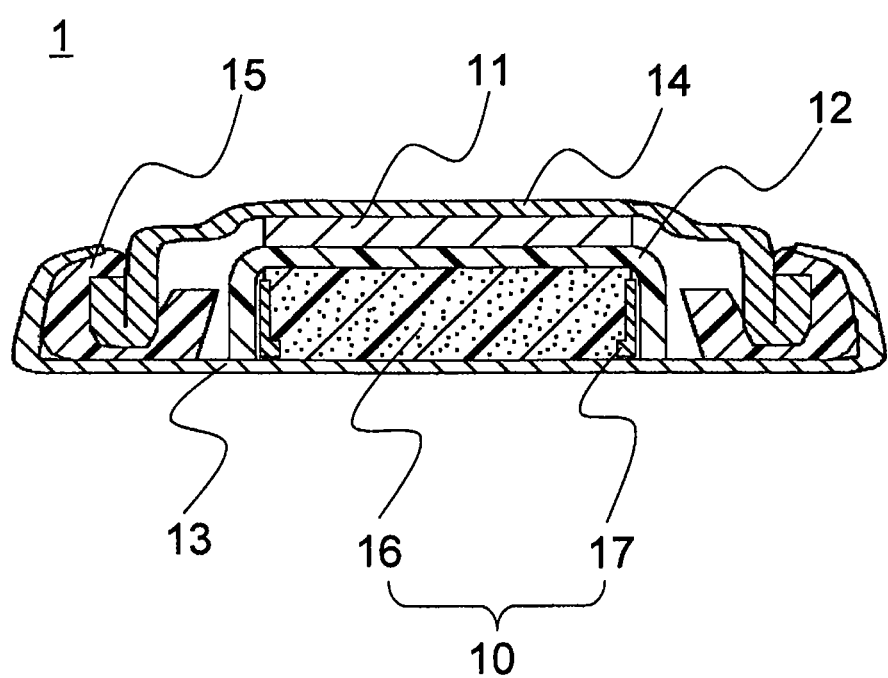
FIG. 1 is a longitudinal sectional view schematically showing the configuration of a lithium battery according to one embodiment of the present invention.

FIG. 1 is a longitudinal sectional view schematically showing the configuration of a lithium battery 1 according to one embodiment of the present invention.

The lithium battery 1 is a coin-shaped primary lithium battery including a positive electrode 10, a negative electrode 11, a separator 12, a positive electrode case 13, a negative electrode case 14, an insulating packing 15, and an organic electrolyte not shown in the figure.

The positive electrode 10 includes a positive electrode mixture 16 and a positive electrode collector ring 17. Although a positive electrode collector ring 17 that serves as a positive electrode current collector is used in this embodiment, the present invention is not limited to this embodiment, and the positive electrode mixture 16 may be disposed directly on the inner surface of the positive electrode case 13 without using the positive electrode collector ring 17.

The positive electrode mixture 16 contains a positive electrode active material and as necessary a binder, a conductive material, and the like.

The positive electrode active material includes low-crystallinity manganese dioxide having a specific surface area of 8 to 28 $m^2/g$ and preferably 14 to 24 $m^2/g$ (hereinafter referred to as "low-crystallinity manganese dioxide" unless specified otherwise). The manganese dioxide used in the present invention has features such as a relatively small specific surface area and low crystallinity.

The low-crystallinity manganese dioxide used as a positive electrode active material can inhibit the gas generating reaction when the battery is stored in a high-temperature environment, thereby enhancing the high-temperature storage characteristics of the lithium battery 1. Here, the gas generating reaction is a reaction in which the non-aqueous solvent contained in the organic electrolyte is oxidatively decomposed by the manganese dioxide, and gas is generated as a by-product of the decomposition of the non-aqueous solvent.

The term "low crystallinity" as used herein means that the crystallinity of the aforementioned manganese dioxide of the present invention is lower than that of heat-treated electrolytic manganese dioxide (γ-β type manganese dioxides, Denchi Binran (Handbook of Batteries) 3rd Ed., Edited by Matsuda & Takehara, Maruzen, 2001, p. 120).

The gas generation during the storage of the lithium battery 1 in a high-temperature environment can be sufficiently inhibited even when the specific surface area of low-crystallinity manganese dioxide is less than 8 $m^2/g$. However, the surface area involved in a discharge reaction is small and thus the polarization of the positive electrode at the time of discharge is large, possibly resulting in, for example, an impaired discharge voltage, discharge capacity, and the like. On the other hand, if the specific surface area of the low-crystallinity manganese dioxide exceeds 28 $m^2/g$, the oxidative degradation reaction of the non-aqueous solvent contained in the organic electrolyte is not sufficiently inhibited when the lithium battery 1 is stored in a high-temperature environment. Consequently, the amount of gas generated in the battery is large, resulting in deformation, such as expansion of the battery, and possibly making a smooth discharge impossible. The specific surface area of the low-crystallinity manganese dioxide can be measured according to, for example, the single-point BET method.

It is preferable that the low-crystallinity manganese dioxide has a ratio [I(110)/I(101)] of the peak intensity I(110) of a diffraction peak for the (110) plane near 2θ=28° to the peak intensity I(101) of a diffraction peak for the (101) plane near 2θ=37.5° of 0.5 to 0.58 in a powder X-ray diffraction pattern with Cu Kα radiation. When the ratio [I(110)/I(101)] is within this range, the reaction of the low-crystallinity manganese dioxide and the non-aqueous solvent during high-temperature storage is further inhibited, thereby further lessening the expansion of the battery. Furthermore, the pulse discharge characteristics after high-temperature storage are also enhanced. Specifically, a high-voltage pulse discharge, for example, can be attained. As used herein, "peak intensity" refers to the height of a peak in a powder X-ray diffraction pattern.

Preferably, the low-crystallinity manganese dioxide contains boron and a Group 2 element.

The boron contained therein further inhibits the generation of gas during high-temperature storage. The boron content of the low-crystallinity manganese dioxide is preferably 0.3 wt % or greater and more preferably 0.8 to 1.4 wt % of the total amount of the low-crystallinity manganese dioxide.

When the boron content is less than 0.3 wt %, the additional gas generation inhibitory effect may be insufficient during the storage in a high-temperature environment at 100° C. or higher. On the other hand, when the boron content exceeds 1.4 wt %, the specific surface area of the low-crystallinity manganese dioxide is excessively small, and the crystallinity may also be greatly impaired. Therefore, while the gas generation in a high-temperature environment is inhibited, the discharge polarization at the time of a battery discharge is increased, possibly resulting in a deteriorated discharge voltage and a reduced battery capacity. The boron content can be measured by, for example, elemental analysis.

The Group 2 element contained therein further inhibits the generation of gas during high-temperature storage. Among Group 2 elements, magnesium and calcium are preferable. These elements exhibit a greater gas generation inhibitory effect than other Group 2 elements. The Group 2 element content of the low-crystallinity manganese dioxide is preferably 0.2 to 5 wt % and more preferably 0.5 to 2 wt % of the total amount of the low-crystallinity manganese dioxide.

When the Group 2 element content is less than 0.2 wt %, the additional gas generation inhibitory effect may be insufficient during the storage in a high-temperature environment at 100° C. or higher. On the other hand, when the Group 2 element content exceeds 5 wt %, the low-crystallinity manganese dioxide is reduced by the Group 2 element, and the discharge capacity may be impaired. The Group 2 element content can be measured by, for example, elemental analysis.

The low-crystallinity manganese dioxide can be produced by, for example, baking electrolytic manganese dioxide. The use of a boron compound and a Group 2 element compound in conjunction with the electrolytic manganese dioxide at this time allows low-crystallinity manganese dioxide containing boron and a Group 2 element to be obtained. The starting manganese dioxide may be electrolytic manganese dioxide, chemically synthesized manganese dioxide, or the like. It is preferable to use electrolytic manganese dioxide, which has a smaller specific surface area than chemically synthesized manganese dioxide. The average particle diameter (volume median diameter) of the electrolytic manganese dioxide is preferably 20 to 60 μm.

The boron compound is preferably, for example, boron oxide, boric acid, metaboric acid, or the like. Such boron compounds can be used singly or as a combination of two or more. The amount of boron compound is suitably selected such that the boron content of the low-crystallinity manganese dioxide obtained after baking is preferably 0.3 wt % or greater and more preferably 0.8 to 1.4 wt % of the total amount of the low-crystallinity manganese dioxide. Usually, the boron compound may be used in a proportion of about 3 wt % of the total amount of the mixture of the electrolytic manganese dioxide, the boron compound, and the Group 2 element compound.

The Group 2 element compound is preferably an oxide, hydroxide, carbonate, or the like of a Group 2 element. Such Group 2 element compounds can be used singly or as a combination of two or more. The amount of Group 2 compound is suitably selected such that the Group 2 compound content of the low-crystallinity manganese dioxide obtained after baking is preferably 0.2 to 5 wt % of the total amount of the low-crystallinity manganese dioxide. Usually, the Group 2 compound may be used in a proportion of about 3 wt % of the total amount of the mixture of the electrolytic manganese dioxide, the boron compound, and the Group 2 element compound.

Suitably selecting the ratio of the electrolytic manganese dioxide to the boron compound and/or the Group 2 element compound enables the specific surface area of the resultant low-crystallinity manganese dioxide to be controlled.

Baking is performed while heating preferably at 350 to 420° C., and terminated in 4 hours or longer and preferably 4 to 24 hours. It should be appreciated that the baking time is not limited to this range and is suitably selected according to the amount to be baked, the ability of a baking furnace (such as an electric furnace) to be used, and other factors. Baking temperatures lower than 350° C. may result in the insufficient removal of the bound water in the manganese dioxide. In such a case, water may leach from manganese dioxide inside the battery, react with lithium contained in the negative electrode, and generate hydrogen, possibly resulting in the expansion or the deformation of the battery.

On the other hand, baking temperatures exceeding 420° C. promote the thermal decomposition of the manganese dioxide, possibly rapidly diminishing the specific surface area and greatly impairing the discharge capacity. In the present invention, baking is performed only once at the aforementioned relatively low temperature for a relatively short period of time, and manganese dioxide having excellent high-temperature storage characteristics can be obtained. Therefore, the production of a positive electrode active material does not require multiple steps or a long period of time, and is production cost advantageous.

The low-crystallinity manganese dioxide obtained in this manner has an X-ray diffraction pattern similar to the X-ray diffraction pattern of heat-treated electrolytic manganese dioxide (γ-β type $MnO_2$, "Denchi Binran (Handbook of Batteries) 3rd Ed.", Edited by Matsuda & Takehara, Maruzen, 2001, p. 120) in X-ray powder diffraction using CuKα radiation. However, the diffraction peaks of the low-crystallinity manganese dioxide have lower peak intensities and are broader than the diffraction peaks of the heat-treated electrolytic manganese dioxide. That is, the low-crystallinity manganese dioxide is less crystalline than the heat-treated electrolytic manganese dioxide.

The primary cause of gas generation in a high-temperature environment in conventional lithium batteries that include manganese dioxide as a positive electrode active material is the reaction of manganese dioxide and an organic electrolyte. Therefore, it is also possible to further improve the high-temperature storage characteristics by modifying the composition of the non-aqueous solvent contained in the organic electrolyte, adding a reaction inhibiting additive to the organic electrolyte, or a like manner. In such a case, it is also possible to use low-crystallinity manganese dioxide and conventional manganese dioxide concomitantly as a positive electrode active material. At this time, the amount of low-crystallinity manganese dioxide is preferably 70 wt % or greater and more preferably 85 to less than 100 wt % of the total amount of low-crystallinity manganese dioxide and conventional manganese dioxide.

Examples of the binder contained in the positive electrode mixture 16 include fluorocarbon resins such as polytetrafluoroethylene (PTFE), polyvinylidene fluoride (PVDF) and modified products thereof, tetrafluoroethylene-hexafluoropropylene copolymers (FEPs), tetrafluoroethylene-perfluoroalkyl vinyl ether copolymers (PFAs), vinylidene fluoride-hexafluoropropylene copolymers, vinylidene fluoride-chlorotrifluoroethylene copolymers, ethylene-tetrafluoroethylene copolymers (ETFE resins), vinylidene fluoride-pentafluoropropylene copolymers, propylene-tetrafluoroethylene copolymers, ethylene-chlorotrifluoroethylene copolymers (ECTFEs), vinylidene fluoride-hexafluoropropylene-tetrafluoroethylene copolymers, and like; styrene butadiene rubber (SBR), modified acrylonitrile rubber, and ethylene-acrylic acid copolymers. Such binders can be used singly or as a combination of two or more.

Examples of the conductive material contained in the positive electrode mixture 16 include acetylene black, Ketjen black, and other carbon blacks, and artificial graphite. Such conductive materials can be used singly or as a combination of two or more.

The positive electrode mixture 16 can be produced by molding the low-crystallinity manganese dioxide. At this time, the positive electrode mixture 16 may be formed by mixing the low-crystallinity manganese dioxide, the binder, and the conductive material, and molding the resultant mixture.

The positive electrode collector ring 17 is a hollow, annular positive electrode current collector having an L-shaped cross section. In addition, various conventional, regularly used positive electrode current collectors can be used. Positive electrode current collectors are made of, for example, aluminium or stainless steel. The positive electrode collector ring 17 may be attached to a molded positive electrode mixture 16, or may be formed integrally when molding the positive electrode mixture 16.

The negative electrode 11 may be composed solely of at least one negative electrode active material selected from metallic lithium and lithium alloys, or may be composed of a negative electrode current collector and a negative electrode active material layer supported thereon. Lithium alloys include alloys of lithium and at least one metallic element selected from the group consisting of aluminium, tin, magnesium, indium, and calcium. The amount of metallic element other than lithium contained in the lithium alloy is preferably 0.1 to 3 wt % of the total amount of the lithium alloy. The negative electrode current collector may be produced from, for example, copper or stainless steel.

As long as the separator 12 is composed of a material that can withstand the temperature range in which the lithium battery 1 is used and that is resistant to organic solvents, the type of material thereof is not particularly limited. Examples of the separator 12 include nonwoven polypropylene fabric, nonwoven polyphenylene sulfide fabric, and microporous films of olefin-based resins such as polyethylene and polypropylene. Such materials may be used singly or as a combination of two or more. Polyphenylene sulfide, which has excellent high-temperature resistance, is particularly preferable as the material of the separator.

For the positive electrode case 13 and the negative electrode case 14, it is possible to use cases that are commonly used in the technical area of lithium primary batteries, for example, cases made of stainless steel.

The insulating packing 15 primarily insulates the positive electrode case 13 and the negative electrode case 14. For the insulating packing 15, it is possible to use a packing made of polypropylene (PP), polyphenylene sulfide (PPS), polyether ether ketone (PEEK), or other synthetic resins. In particular, PPS has excellent high-temperature resistance and solvent resistance as well as favorable moldability, and is thus preferable.

The organic electrolyte contains a non-aqueous solvent and a solute (supporting salt) dissolved therein.

For the non-aqueous solvent, solvents that are known in the technical area of lithium batteries can be used without particular limitations. In consideration of the solubility of the solute, a high-permittivity solvent such as propylene carbonate (PC), ethylene carbonate (EC), butylene carbonate (BC), or the like is preferable as the non-aqueous solvent. Note that EC has a high melting point of about 40° C. and thus poses the problem that its low-temperature ionic conductivity is poor. Therefore, EC is preferably used in combination with a solvent having a low melting point. One of the typical solvents that have a low melting point and low viscosity and that are used for lithium batteries is 1,2-dimethoxyethane (DME).

It is preferable that the non-aqueous solvent contains PC and DME when the low-temperature ionic conductivity is considered. These solvents enhance the low-temperature ionic conductivity.

In addition, a mixed solvent of a high-permittivity solvent and dimethyl carbonate (DMC), diethyl carbonate (DEC), ethyl methyl carbonate (EMC), 1,3-dioxolane, 2-methyltetrahydrofuran, or the like can be used as the non-aqueous solvent. Furthermore, a mixed solvent of a high-permittivity solvent, an organosulphur compound such as 1,3-propanesultone well known as an additive that inhibits gas generation, and vinylene carbonate or the like can also be used as the non-aqueous solvent.

Examples of the solute dissolved in the non-aqueous solvent include lithium hexafluorophosphate ($LiPF_6$), lithium perchlorate ($LiClO_4$), lithium trifluoromethanesulfonate ($LiCF_3SO_3$), lithium bis(trifluoromethane sulfonyl)imide ($LiN(SO_2CF_3)_2$), and lithium bis(pentafluoroethane sulfonyl)imide ($LiN(SO_2C_2F_5)_2$). Such solutes may be used singly or as a combination of two or more. The concentration of solute in the organic electrolyte is preferably 0.3 to 1.5 mol/L and more preferably 0.5 to 1 mol/L.

The lithium battery 1 may be produced, for example, as described below.

First, the positive electrode collector ring 17 is disposed around the positive electrode mixture 16 and accommodated in the positive electrode case 13, and the separator 12 is mounted thereon. Furthermore, the organic electrolyte is poured so as to impregnate the positive electrode mixture 16 and the separator 12 with the organic electrolyte.

Meanwhile, a molded article of lithium or a lithium alloy that serves as the negative electrode 11 is press-fitted against the inner surface of the flat portion of the negative electrode case 14. Then, with the insulating packing 15 being placed around the outer edge of the negative electrode case 14, the positive electrode case 13 and the negative electrode case 14 are combined. Furthermore, the edge of the opening of the positive electrode case 13 is crimped inward for sealing, and thereby the lithium battery 1 is obtained. If necessary, the surface of the lithium battery 1 may further be furnished with a cover composed of a resin film or the like.

EXAMPLES

Examples and Comparative Examples are given below to specifically describe the present invention.

Example 1

Production of Low-Crystallinity Manganese Dioxide

Electrolytic manganese dioxide (BET specific surface area of 18 $m^2/g$, volume median diameter of 30 μm), boron oxide ($B_2O_3$), and magnesium hydroxide ($Mg(OH)_2$) were mixed in a weight ratio of 100:3.5:3. The resultant mixture was baked at 400° C. for 8 hours, yielding low-crystallinity manganese dioxide. The average particle diameter (volume median diameter) of the resultant low-crystallinity manganese dioxide was 31 μm.

The particle size distribution of the resultant low-crystallinity manganese dioxide particles was measured with a flow particle image analyzer (trade name: FPIA-3000, manufactured by Sysmex Corporation). Specifically, the low-crystallinity manganese dioxide-containing sample thus obtained was dispersed in surfactant-containing water to yield a mixture, and this mixture was photographed with the aforementioned flow particle image analyzer. For each manganese dioxide particle, the resultant image was subjected to an image analysis to measure the particle size distribution of the manganese dioxide particles.

The specific surface area of the resultant low-crystallinity manganese dioxide measured under the following conditions according to the single-point BET method was 21.5 $m^2/g$.

Measuring device: Macsorb HM-1201 (trade name) manufactured by Mountech Co., Ltd.

Sample weight: 0.4 to 0.3 g

Pre-measurement dehydration conditions: retaining for 60 minutes while flowing dry nitrogen gas at 120° C.

Adsorption measurement gas: mixed gas containing helium and nitrogen in a volume ratio of 7:3

Adsorption measurement temperature: cooling from 20 to −196° C.

Desorption measurement temperature: heating from −196 to 20° C.

The boron content and the magnesium content of the resultant low-crystallinity manganese dioxide according to an elemental analysis were 1.1 wt % and 1.2 wt %, respectively.

(Production of Positive Electrode Plate)

The low-crystallinity manganese dioxide obtained above, ketchen black (conductive material), and a tetrafluoroethylene-hexafluoropropylene copolymer (binder) were mixed in a weight ratio of 100:5:5. After adding a suitable amount of water to it, the resultant mixture was sufficiently kneaded to yield a positive electrode mixture in the form of a paste. This positive electrode mixture was dried at 100° C. and subjected to compression molding in a hydraulic press using a specific metal mold to yield a positive plate.

(Production of Negative Electrode Plate)

Metallic lithium punched out of a hoop using a specific metal mold was used as a negative electrode plate.

(Production of Battery)

A coin-shaped lithium primary battery as shown in FIG. 1 was produced.

A negative electrode was press-fitted against the inner bottom surface of a stainless-steel negative electrode case. A polyphenylene sulfide insulating packing was placed around the outer edge of the negative electrode case.

The positive electrode plate obtained above was dried at 250° C. for 4 hours. The dried positive electrode plate was inserted into a stainless-steel positive electrode collector ring having an L-shaped cross section, and mounted on the inner surface of a stainless-steel positive electrode case.

Next, a separator (thickness: 100 μm) made of nonwoven polyphenylene sulfide fabric punched out in a circular shape was mounted on the positive electrode plate. This separator was then impregnated with an organic electrolyte. The organic electrolyte was prepared by dissolving $LiClO_4$ in a concentration of 0.6 mol/L in a mixed solvent in which propylene carbonate (PC) and 1,2-dimethoxyethane (DME) were mixed in a volume ratio of 7:3.

Next, the negative electrode case against which the negative electrode plate was press-fitted was placed over the separator such that the negative electrode plate faced the positive electrode with the separator being disposed therebetween. The rim of the positive electrode case was crimped on the negative electrode case with the insulating packing disposed therebetween, and thus the battery was sealed by crimp sealing. In this way, a coin-shaped lithium battery with a nominal capacity of 500 mAh having a diameter of 24 mm and a height of 5.0 mm was prepared. The battery production was carried out in dry air having a dew point of no more than −50° C. Six cells of this battery were produced.

Example 2

Electrolytic manganese dioxide, boric acid ($H_3BO_3$), and calcium oxide were mixed in a weight ratio of 100:2:8, and the resultant mixture was baked at 420° C. for 8 hours. The specific surface area of the resultant low-crystallinity manganese dioxide was 28 m²/g. The average particle diameter (volume median diameter) thereof was 33 μm. The boron content of the low-crystallinity manganese dioxide was 0.3 wt %, and the calcium content thereof was 5 wt %.

The coin-shaped lithium battery of Example 2 was obtained in the same manner as in Example 1 except that the above-described manganese dioxide was used as a positive electrode active material, and an organic electrolyte in which $LiClO_4$ was dissolved in a concentration of 0.6 mol/L and 1,3-propanesultone was dissolved in a concentration of 2 wt % in a mixed solvent of PC and DME in a volume ratio 7:3 was used.

Example 3

Electrolytic manganese dioxide, boron oxide ($B_2O_3$), calcium oxide, and water were mixed in a weight ratio of 100:5:0.3:5, and the resultant mixture was baked at 350° C. for 8 hours. The specific surface area of the resultant low-crystallinity manganese dioxide was 8 m²/g. The average particle diameter (volume median diameter) thereof was 31 μm. The boron content and the calcium content of the low-crystallinity manganese dioxide were 1.4 wt % and 0.2 wt %, respectively.

An organic electrolyte was prepared by adding 0.5 wt % of 1,3-propanesultone to a solution in which $LiClO_4$ was dissolved in a concentration of 1.0 mol/L in a mixed solvent of propylene carbonate (PC) and 1,2-dimethoxyethane (DME) (PC:DME=6:4 (volume ratio)).

The coin-shaped lithium battery of Example 3 was obtained in the same manner as in Example 1 except that the above-described low-crystallinity manganese dioxide and organic electrolyte were used.

Example 4

Electrolytic manganese dioxide, boron oxide ($B_2O_3$), strontium oxide (SrO), and water were mixed in a weight ratio of 100:3:0.6:5, and the resultant mixture was baked at 380° C. for 8 hours. The specific surface area of the resultant low-crystallinity manganese dioxide was 20.3 m²/g. The average particle diameter (volume median diameter) thereof was 32 μm. The boron content and the strontium content of the low-crystallinity manganese dioxide were 0.9 wt % and 0.5 wt %, respectively.

The coin-shaped lithium battery of Example 4 was obtained in the same manner as in Example 3 except that the above-described low-crystallinity manganese dioxide was used.

Comparative Example 1

Electrolytic manganese dioxide was baked at 400° C. for 4 hours, thereby yielding baked manganese dioxide. The BET specific surface area of the resultant baked manganese dioxide was 24.7 m²/g. The average particle diameter (volume median diameter) thereof was 30 μm. The coin-shaped lithium battery of Comparative Example 1 was obtained in the same manner as in Example 2 except that this baked manganese dioxide was used as a positive electrode active material.

Comparative Example 2

Electrolytic manganese dioxide and boric acid were mixed in a weight ratio of 100:0.5, and the resultant mixture was baked at 380° C. for 8 hours. The specific surface area of the resultant baked manganese dioxide was 26.1 m²/g. The average particle diameter (volume median diameter) thereof was 30 μm. The boron content of the baked manganese dioxide was 0.1 wt %. The coin-shaped lithium battery of Comparative Example 2 was obtained in the same manner as in Example 2 except that this baked manganese dioxide was used as a positive electrode active material.

Comparative Example 3

Electrolytic manganese dioxide, boron oxide, phosphorus pentoxide, and water were mixed in a weight ratio of 100:2:3:5, and the resultant mixture was baked at 400° C. for 4 hours. The specific surface area of the resultant baked manganese dioxide was 29.5 m²/g. The average particle diameter (volume median diameter) thereof was 31 μm. The boron content and the phosphorus content of the baked manganese dioxide were 0.6 wt % and 1.3 wt %, respectively. The coin-shaped lithium battery of Comparative Example 3 was obtained in the same manner as in Example 2 except that this baked manganese dioxide was used as a positive electrode active material.

Figure 2:
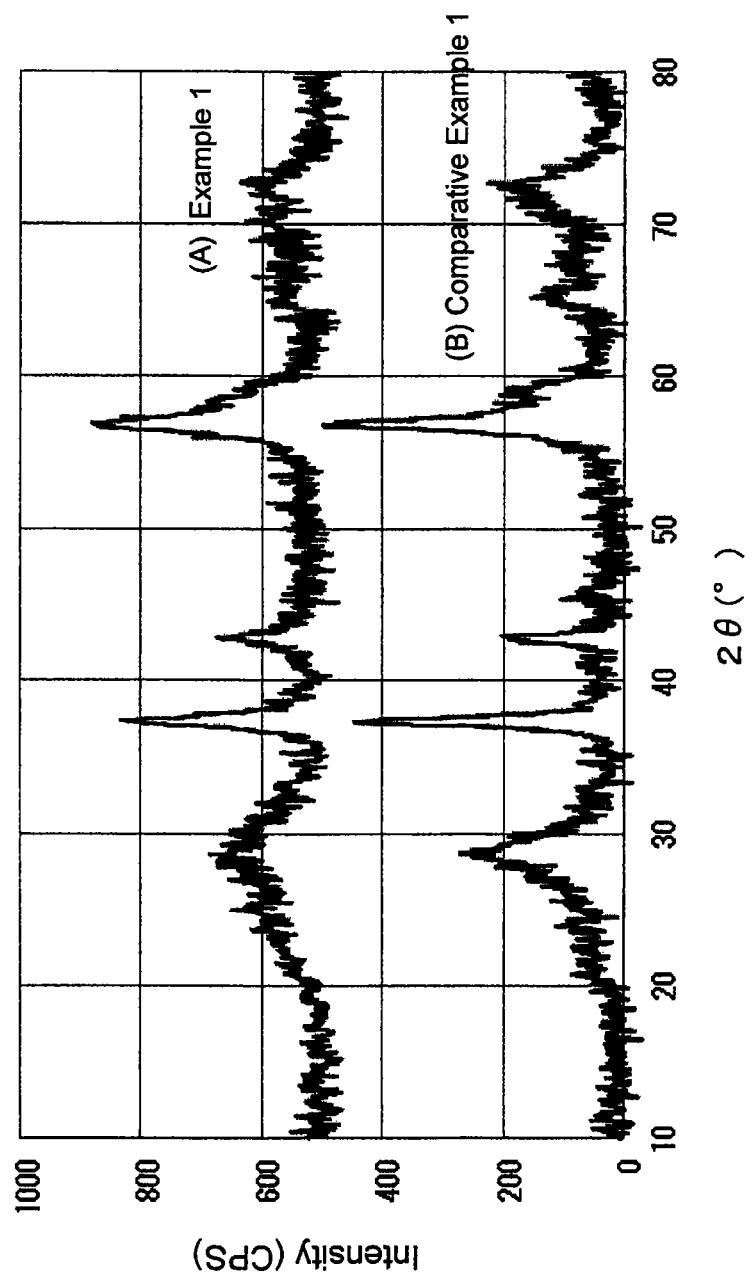
FIG. 2 is a chart showing the X-ray diffraction pattern (A) of the low-crystallinity manganese dioxide of Example 1 and the X-ray diffraction pattern (B) of the baked manganese dioxide of Comparative Example 1.

The X-ray diffraction patterns of the low-crystallinity manganese dioxide obtained in Example 1 and the baked manganese dioxide obtained in Comparative Example 1 were obtained according to powder X-ray diffractometry using CuKα radiation. FIG. 2 shows the results. FIG. 2 shows the X-ray diffraction patterns of the manganese dioxides of Example 1 and Comparative Example 1. In FIG. 2, (A) marks the X-ray diffraction pattern of the low-crystallinity manganese dioxide of Example 1 and (B) marks the X-ray diffraction pattern of the baked manganese dioxide of Comparative Example 1. The measurement conditions of the X-ray diffractometry are as follows.

Light source: CuKα radiation (Kα1=1.5405 Å, Kα2=1.5443 Å)
Divergence slit: ¼°
Scattering slit: ¼°
Receiving light slit: 0.15 mm
Step width: 0.004°

The conditions were such that, using Si as a standard sample, the Bragg angle 2θ of the Si was the half width 0.07 to 0.08° of 47.3° (220 diffraction line).

As can be understood from FIG. 2, the low-crystallinity manganese dioxide of Example 1 and the baked manganese dioxide of Comparative Example 1 showed similar diffraction peaks. However, the diffraction peaks of the low-crystallinity manganese dioxide of Example 1 are globally smaller, indicating its low crystallinity. In particular, it can be understood that the peak intensity (cps) of a diffraction peak of the low-crystallinity manganese dioxide of Example 1 that corresponds to the main peak (diffraction peak for the (101) plane near 2θ=37.5° C.) of the baked manganese dioxide of Comparative Example 1 is smaller and broader than the peak intensity of the diffraction peak of the manganese dioxide of Comparative Example 1.

The intensity ratio [I(110)/I(101)] of the intensity I(110) of the diffraction peak near 2θ=28° derived from the (110) plane to the intensity I(101) of the diffraction peak near 2θ=37.5° derived from the (101) plane in Example 1 was 0.55. In addition, as shown in Table 1, the ratio [I(110)/I(101)] in other Examples was similar to that in Example 1. That is, the diffraction patterns of powder X-ray diffractometry showed that the manganese dioxide used in each Example was of low crystallinity.

On the other hand, the intensity ratio [I(110)/I(101)] of the peak intensity I(110) of the (110) peak near 2θ=28° to the intensity I(101) of the diffraction peak for the (101) plane near 2θ=37.5° was 0.62 in the X-ray diffraction chart of the manganese dioxide used in Comparative Example 1.
[Evaluation]
The following evaluation was performed.
(Measurement of Initial Discharge Capacity)

The batteries of Examples 1 to 4 and Comparative Examples 1 to 3 were subjected to a pre-discharge at a constant current of 3 mA for 5.5 hours and then to aging at 60° C. for 3 days. The appearance of the batteries after aging was visually inspected and their open-circuit voltage (OCV) was measured, and it was confirmed that there was no defect.

Next, three cells of each battery of Examples 1 to 4 and Comparative Examples 1 to 3 were discharged to 2 V by a 10 kΩ constant-resistance discharge at 25° C. so as to obtain their initial discharge capacity. Table 1 shows the average of the initial discharge capacities of the three cells of each battery of Examples 1 to 4 and Comparative Examples 1 to 3. The specific surface areas and the peak intensity ratios [I(110)/I(101)] of the manganese dioxides used in Examples 1 to 4 and Comparative Examples 1 to 3 are also presented in Table 1.
(High-Temperature Storage Characteristics)

The three cells of each battery of Examples 1 to 4 and Comparative Examples 1 to 3 were stored at 125° C. for 1 day. These batteries were subjected to a pulse discharge in a low-temperature environment of −40° C. at a current value of 2.5 mA for 1 second so as to measure the discharge minimum voltage (CCV). Thereafter, the batteries were brought back to the 125° C. environment and further stored at 125° C. for 4 days. The total height of each battery was then measured, and the difference between the measured value thus obtained and the total battery height before storage was regarded as the extent of battery expansion by the 5-day storage at 125° C. The discharge minimum voltage (CCV) at −40° C. and the extent of battery expansion after the 5-day storage at 125° C. of the three cells were averaged and are presented in Table 1.

tunnel structure, a greatly reduced intensity ratio [I(110)/I(101)] inhibits the discharge reaction and is thus not preferable.
(About Pulse Discharge Characteristics after High-Temperature Storage)

The CCV values at −40° C. measured after one-day storage at 125° C. in Examples 1 to 4 were all 2.2 V or greater. However, the CCV values at −40° C. in Comparative Examples 1 and 2 were less than 2 V, indicating serious storage-induced deterioration. The CCV value of the battery of Comparative Example 3 was also reduced to about 2 V, indicating high-temperature storage-induced deterioration.

It seems that the greatly reduced CCV values at −40° C. in Comparative Examples 1 and 2 are due to the significant expansion of the batteries. That is, it seems that the CCV values at −40° C. were greatly reduced because the reaction of the positive electrode and the organic electrolyte was not inhibited, generating large amounts of gas, and thus the electrical connection, the ionic conduction, and the like within the batteries were deteriorated.
(About Battery Expansion after High-Temperature Storage)

Using the result of measuring the total height of a battery after the 5-day storage at 125° C., the difference in total height from the battery before storage was obtained and was regarded as the extent of battery expansion by the storage at 125° C. The total height of each battery before storage was all within the range of 4.8 to 4.9 mm.

It can be understood that a large expansion of 1.2 mm or greater occurred in Comparative Example 1. The measurement of the impedance at 1 kHz of the battery of Comparative Example 1 revealed that the battery internal resistance was increased to 100Ω or greater and the battery was in a state of not allowing discharging to proceed smoothly. It can be understood that, in Comparative Example 2 where boron was added singly and in Comparative Example 3 where boron and

TABLE 1

|  |  | Specific surface area (m²/g) | I(110)/ I(101) | Discharge capacity (mAh) | Pulse discharge CCV (V) at −40° C. | Battery expansion after storage at 125° C. (mm) |
|---|---|---|---|---|---|---|
| Example | 1 | 21.5 | 0.55 | 501 | 2.428 | 0.139 |
|  | 2 | 28 | 0.58 | 487 | 2.382 | 0.307 |
|  | 3 | 8 | 0.50 | 493 | 2.227 | 0.114 |
|  | 4 | 20.3 | 0.52 | 488 | 2.206 | 0.145 |
| Comparative | 1 | 24.7 | 0.62 | 505 | 1.584 | 1.283 |
| Example | 2 | 26.1 | 0.59 | 483 | 1.871 | 1.004 |
|  | 3 | 29.5 | 0.48 | 436 | 2.015 | 0.995 |

(About Initial Discharge Capacity)

The initial discharge capacities in Examples 1 to 4 were slightly smaller than in Comparative Example 1. This seems to result from, for example, the increased discharge polarization due to the reduced specific surface area of the positive electrode active material, and the reduced manganese valence due to the addition of boron and a Group 2 element.

While the discharge capacity was slightly reduced also in Comparative Example 2 where boron was added singly, the capacity was reduced 10% or greater in Comparative Example 3 where boron and phosphorus were added. The peak intensity ratio [I(110)/I(101)] according to powder X-ray diffractometry in Comparative Example 3 was reduced to 0.48. This seems to suggest that the crystalline structure of γ-β type MnO$_2$, in particular the regularity of the "2×1" tunnel structure, was deteriorated. It can be understood that, since it is believed that lithium ions are diffused within the "2×1"

phosphorus were added, the battery expansion due to the storage at 125° C. was more inhibited than in Comparative Example 1 where nothing was added, but a battery expansion of about 1 mm was observed and their inhibitory effect was small.

On the other hand, in Examples 1 to 4, the expansion was no more than 0.4 mm, and in Examples 1, 3, and 4 in particular, the battery expansion was no more than 0.15 mm. In other words, it can be understood that the effect of the present invention in which low-crystallinity manganese dioxide to which boron and a Group 2 element are added is significant. Moreover, in Examples 1 to 3 where boron and magnesium or calcium are used in combination, the low-temperature large-current pulse discharge characteristics after the storage at 125° C. are also favorable, and thus it is possible to greatly enhance the storage characteristics at high temperatures of 100° C. or higher.

In lithium batteries, manganese dioxide for use as a positive electrode active material has a strong ability to oxidatively activate organic solvents, and therefore the high-temperature storage characteristics of conventional lithium batteries are deteriorated significantly. In this connection, a feature of the present invention is to add boron and a Group 2 element such as magnesium or calcium to manganese dioxide that serves as a positive electrode active material. This is to attain manganese dioxide of a smaller specific surface area than conventional manganese dioxide, also to reduce the ability to oxidatively activate organic solvents, and to enhance the high-temperature storage characteristics of the lithium battery.

However, an excessively small specific surface area of manganese dioxide results in an increased current density in the battery reaction, and the reaction polarization is thus increased, deteriorating the battery voltage and diminishing the discharge capacity.

Meanwhile, since the generation of gas occurs due to the reaction of manganese dioxide and an organic electrolyte, it seems that a gas generation inhibitory effect is varied depending on the type of the non-aqueous solvent contained in the organic electrolyte, the composition thereof, the presence/absence of additives, and like factors. Therefore, in the present invention, an organic electrolyte that has a composition different from those described in the Examples above may be used, or an organic electrolyte to which a specific additive has been added may be used.

INDUSTRIAL APPLICABILITY

The lithium battery of the present invention has excellent high-temperature storage characteristics and is cost advantageous. The lithium battery is useful as a power source of, for example, portable electronic devices and in-car electronic devices.

The invention claimed is:

1. A lithium battery comprising a positive electrode, a negative electrode, and an organic electrolyte, wherein:
   said positive electrode comprises low-crystallinity manganese dioxide having a specific surface area of 14 to 28 $m^2/g$ as a positive electrode active material,
   said low-crystallinity manganese dioxide has a ratio $[I(110)/I(101)]$ of peak intensity $I(110)$ of a diffraction peak for a (110) plane near $2\theta=28°$ to peak intensity $I(101)$ of a diffraction peak for a (101) plane near $2\theta=37.5°$ of 0.5 to 0.58 in a powder X-ray diffraction pattern with CuKα radiation,
   said negative electrode comprises at least one selected from metallic lithium and lithium alloys as a negative electrode active material, and
   said low-crystallinity manganese dioxide comprises boron and a Group 2 element, said boron being contained in an amount of 0.3 to 1.4 wt % of a total amount of said low-crystallinity manganese dioxide.

2. The lithium battery in accordance with claim 1, wherein said Group 2 element is contained in an amount of 0.2 to 5 wt % of a total amount of said low-crystallinity manganese dioxide.

3. The lithium battery in accordance with claim 2, wherein said Group 2 element is magnesium or calcium.

4. The lithium battery in accordance with claim 1, wherein said low-crystallinity manganese dioxide has less crystallinity than heat-treated electrolytic λ-β type manganese dioxide.

* * * * *